C. R. ROBERTS & F. WEBER.
MANURE LOADER.
APPLICATION FILED JULY 11, 1908.
905,927.
Patented Dec. 8, 1908.
2 SHEETS—SHEET 1.
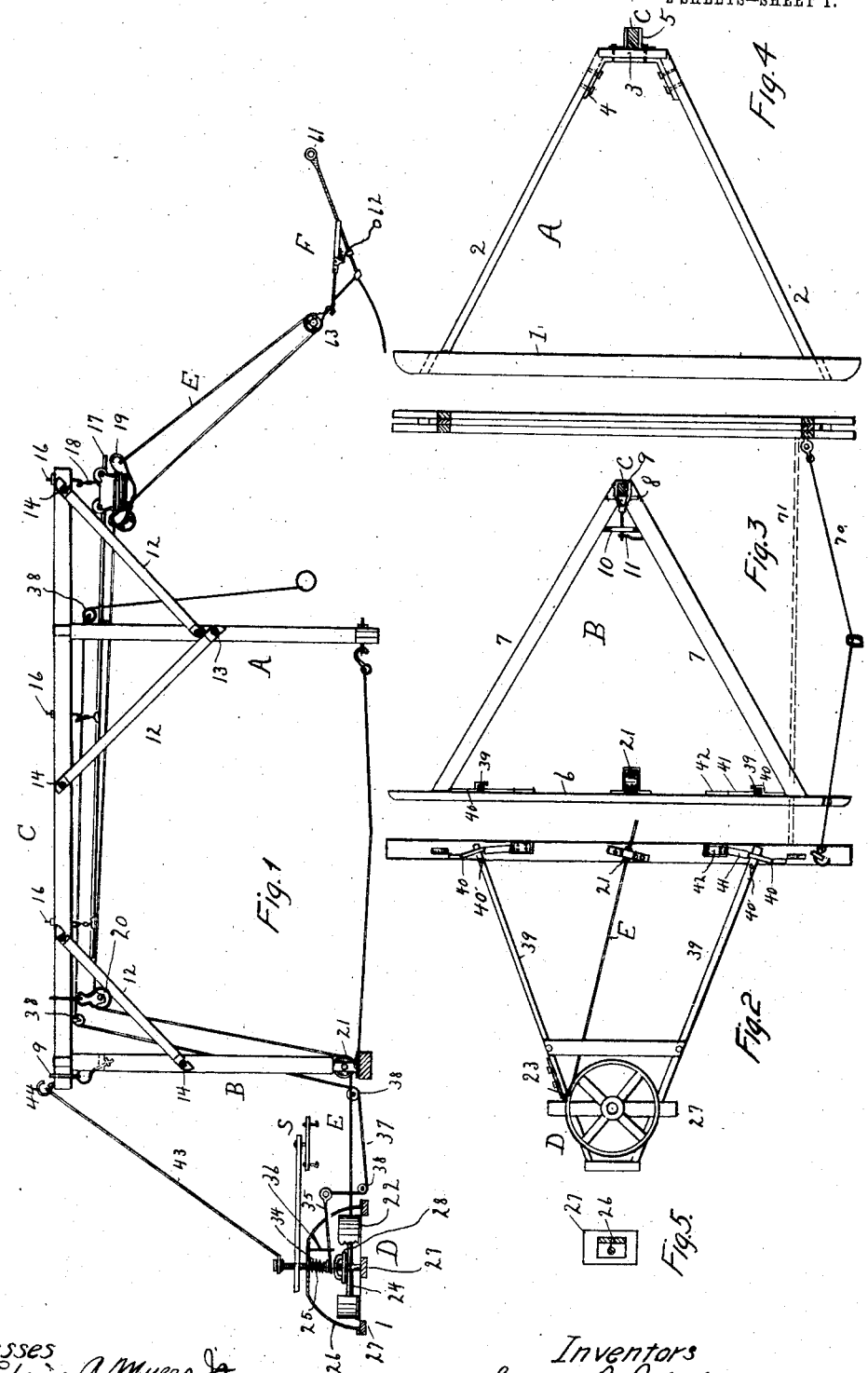
Witnesses
Edwin A. Myers Jr.
John A. Hurst
Inventors
Charles R. Roberts
Fritz Weber
by J. A. Ram
atty

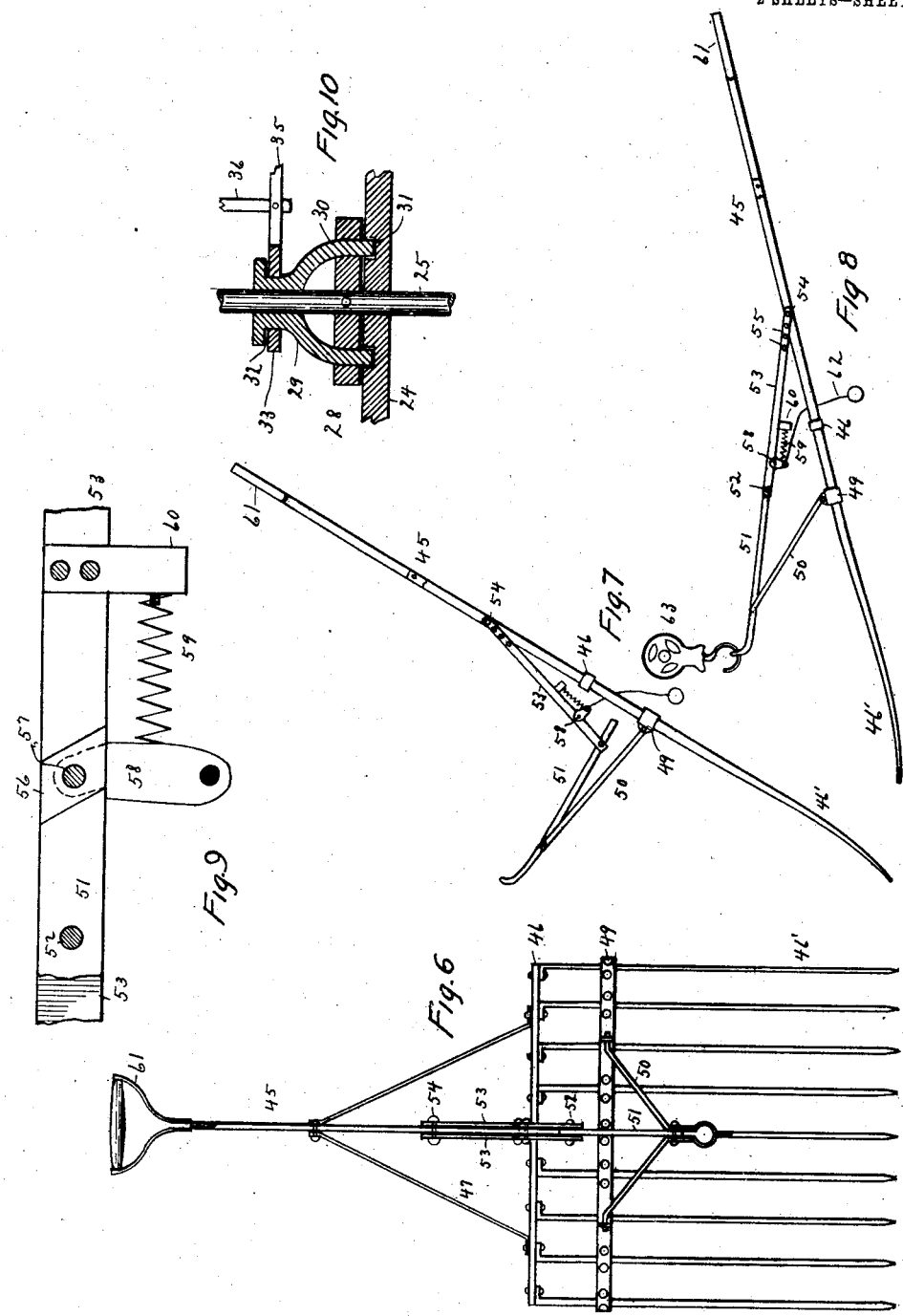

UNITED STATES PATENT OFFICE.

CHARLES R. ROBERTS AND FRITZ WEBER, OF SWEET SPRINGS, MISSOURI.

MANURE-LOADER.

No. 905,927.      Specification of Letters Patent.      Patented Dec. 8, 1908.

Application filed July 11, 1908. Serial No. 443,168.

*To all whom it may concern:*

Be it known that we, CHARLES R. ROBERTS and FRITZ WEBER, citizens of the United States, residing at Sweet Springs, in the county of Saline and State of Missouri, have invented new and useful Improvements in Manure-Loaders, of which the following is a specification.

Our invention is an apparatus for loading manure in large quantities from the ground into a wagon, being especially adapted for use where the manure is spread out over the ground and it is necessary to use the fork over considerable area. We have designed our invention for operation by horse-power or other suitable power so that a wagon may be quickly loaded by one man by the use of our apparatus, the operator merely guiding the fork, and controlling it and the power device, the main work being done through the power device.

To this end it consists of the parts, improvements, and combinations hereinafter set forth.

In the drawings accompanying and forming part of this specification, and in the description of the drawings, we have shown our invention in its preferred form, and have shown the best mode of applying the principles thereof; but it is to be understood that our invention is not confined to the exact details of construction shown in those drawings or in that description; and that, within the scope of the appended claims, we contemplate changes in form, proportions, material, and arrangement, the tranposition of parts, and the substitution of equivalent members, without departing from the spirit of our invention.

Figure 1 is a side elevation of a manure loader made in accordance with the principles of our invention, a part of the drum being broken away to disclose the clutch mechanism. Fig. 2 is a plan view of the power mechanism and the base of the adjacent upright of the frame, parts of the power mechanism being removed. Fig. 3 is a view from the end of that upright. Fig. 4 is a view of the other upright. Fig. 5 is a view of one of the feet of the braces of the power device. Fig. 6 is an enlarged plan view of the fork. Fig. 7 is a side view of the fork in its secondary position when its contents are dumped. Fig. 8 is a similar view of the fork in position for carrying a load. Fig. 9 is an enlarged view of the joint of the connecting rod of the fork with the spring-pressed latch for operating the discharge. Fig. 10 is an enlarged vertical center sectional view of the clutch mechanism.

Similar reference characters indicate like or corresponding parts throughout the several views.

A represents one of the upright frames, standards, or supports of the derrick, and B is the other; C is the ridge beam or ridge pole supported thereon; D is a suitable power device; E is the cable or rope; and F is the fork. These principal parts, together with the trippers, pulleys, and carriers hereinafter referred to constitute the main parts of our device.

The part A consists of the base or runner 1 on which are erected the two studs 2, 2, spaced considerably apart at the base, and coming nearly or quite together at the top where they are secured together by means of a cross-piece 3 and strap iron 4.

5 represents a pair of brackets forming a slot or socket in which the ridge pole may be seated.

The part B consists of the base or runner 6 on which are erected the two studs 7, 7, secured together at their tops by a bolt or collar 8, and thereon is secured the ridge pole C by means of a loop bolt and tail-nut 11, which engages a cross-piece 10.

12, 12 represent a number of braces for rigidly holding the derrick against lateral displacement, the braces being secured to the other members by means of pins 14, and transverse slots 13. By means of these devices, the parts A, B, and C may be easily and quickly put together or taken down, by merely loosening the tail-nut and removing the braces; a feature of considerable importance in shipping and moving.

17 represents an ordinary carrier track suspended by a number of chains 18, 18, 18 to J-bolts 16, 16 in the ridge-beam C. The height and slant of the track may be adjusted by taking up or letting out one or more links of the several chains.

19 is a carrier of any suitable type, preferably the hay-carrier now in common use, provided with latches and other details not here necessary to be shown as they are well known in the art.

The rope E passes from the carrier over pulleys 20, 21, to the drum 22 of the power device. The power device is provided with a spring-pressed brake 23 whose function is merely to have a slight tension on the rope to keep the slack from unwinding more than allowed by the rotation of the drum.

24 represents the spokes and hub of the drum, mounted loosely on the vertical shaft 25; and 26 are braces and 27 the base.

28 represents a hub keyed to the shaft; and 29 is another hub slidably mounted on the shaft and provided with a number of prongs or fingers 30, 30, which extend freely through holes in the hub 28, and also adapted to engage in, or be disengaged from registering holes 31, 31 in the hub of the drum.

32 is a channel in which works a collar 33 forming one end of the trip lever 35 which is pivoted to a bracket 36, and to the other end of which is secured the trip cord 37, which passes over a number of pulleys 38, 38 to wherever it is desired to control it. Cord 37 pulls opposite to the compression spring 34.

39, 39 represent a pair of beams on which the power device is mounted, they each being secured, removably, at their other ends to the base 6, under brackets 40, and held in place by means of wedge blocks (removable) and socket blocks 42 secured to said base. Pins 40' may be provided to prevent the power device from pushing inwardly.

43 is an additional brace rod extending from the top of shaft 25 to a hook 44 in the end of the ridge-beam.

45 is the handle of the fork; 46 is the cross-base at the butt of the tines 46', secured to the handle and also to the braces 47, 47.

49 is a reinforcing cross-bar, to which is pivoted the bail 50, to the upper part of which is pivoted a rod 51, the other end of which is pivoted at 52, to one end of a rod 53, the other end of which is adjustably pivoted to the handle at 54.

56 is a block against which the end of the rod 51 butts when the said jointed rod comprising 51 and 53 is straight.

58 is a latch pivoted to 53 at 57, and pressed forward normally to engage under the end of 51 thus holding the said jointed rod straight; the other end of the spring 59 bearing against the lug 60.

61 is the handle of the fork, or rather the hand-hold of the handle.

62 is a cord secured to the latch 58 for tripping same, permitting the fork to dump its load, as indicated in Fig. 7.

S is the sweep by which the power device may be operated.

The ridge-beam and track extend out beyond the standard A. A wagon may be placed under the derrick between the two frames A and B; and the fork may be drawn out as far as may be desired, and in any position within a reasonable range; and by then applying the power, the fork may be loaded, being guided by the operator, and drawn up to the carrier and over to the wagon, when it will be stopped by the trip-cord 37, and dumped by the trip-cord 62.

If it is desired to pull the device around in the yard in order to cover a greater area or different location, then this may be done while the device is standing by means of a rope 70, and separating beam 71, which may be detachably secured to either side.

What we claim is:

1. In an apparatus of the kind described, the combination of two upright frames, each frame comprising a base, and two legs, the legs being spaced apart at the base and coming together at the top, a ridge-pole supported on top of said frames, pins in said ridge-pole and in said legs, braces for connecting said ridge-pole and frames and having transverse slots for engaging said pins, a track supported by the ridge-pole, a carrier and a fork and cable, a power device detachably connected with one of said frames, and said ridge-pole and track extending out beyond the other frame.

2. In an apparatus of the kind described, the combination with a frame, a track supported thereby, a carrier, and a cable; of a fork consisting of the tines, a handle rigidly secured thereto, a bail pivoted to the tines, a jointed rod extending between the bail and the handle, and a spring-pressed latch for controlling said jointed rod.

3. An apparatus of the kind described, comprising the combination with two upright supporting frames, a ridge-pole thereon extending out beyond one of said frames, a track supported by the ridge-pole, a carrier on the track, a cable, and a fork; of a power device, beams supporting the power device and removably connected with the other supporting frame, and a trip and cord for controlling said power device.

In testimony whereof we have hereunto signed our names in the presence of witnesses.

CHARLES R. ROBERTS.
FRITZ WEBER.

Witnesses to signature of Charles R. Roberts:
F. O. ROBERTS,
H. NEAL.

Witnesses to signature of Fritz Weber:
LEO BURFEIND,
R. L. WALL.